Feb. 25, 1969    B. C. WAGNER    3,429,753

METHOD OF FORMING METAL BORIDE COATING ON WIRE

Filed June 29, 1965

Inventor:
Bernard C. Wagner,
by Charles W. Helzer
His Attorney.

United States Patent Office 3,429,753
Patented Feb. 25, 1969

3,429,753
METHOD OF FORMING METAL BORIDE COATING ON WIRE
Bernard C. Wagner, Schenectady, N.Y., assignor to General Electric Company, a corporation of New York
Filed June 29, 1965, Ser. No. 468,017
U.S. Cl. 148—6      9 Claims
Int. Cl. C23f *14/02, 17/00;* C23c *3/00*

My invention is directed to a process of protectively coating high melting point, low vapor pressure metals and to articles including such protective coatings.

Metals such as copper, nickel, chromium, etc., are generally vapor deposited onto substrates from heating crucibles maintained under vacuum at pressures of $1 \times 10^{-3}$ mm. of Hg or less and heated to temperature levels of from 1000° C. to 1500° C. These crucibles are typically electrically heated by high melting point, low vapor pressure metal windings embedded in a thermally insulative particulate refractory.

Prior to my invention, these crucibles have been short-lived. While substantial protection is afforded both by the surrounding refractory and the vacuum environment, sufficient oxygen and water vapor frequently remains in the surrounding particulate refractory to react with the windings at high temperatures. The reaction products are volatile at operating temperatures, and in passing upwardly through the refractory particles fuse therewith to form a ceramic melt. Once a body of melt is formed, the windings are soon dissolved and the utility of the crucible destroyed.

It is an object of my invention to protectively coat high melting point, low vapor pressure metals.

It is another object to provide a process of obtaining coatings of uniform thickness.

It is a further object to provide a process of coating the windings of a heating crucible which can be combined with using the crucible.

It is an additional object to provide high melting point, low vapor pressure metal articles having uniform, melt-resistant, thermal shock-resistant coatings.

It is a more specific object to provide electrical heating elements resistant to failure at high temperatures.

It is yet another object to provide heating crucibles having improved electrical windings.

These and other objects of my invention are accomplished by coating high melting point, low vapor pressure metals with boron nitride and heating the metals through a temperature level of 1000° C. at a pressure below $2 \times 10^{-1}$ mm. of Hg. The articles formed include a high melting point, low pressure metal substrate having a thin, uniform, adherent coating of metal boride.

Figure 1:
Figure 2:
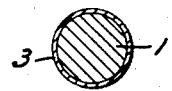
Figure 3:
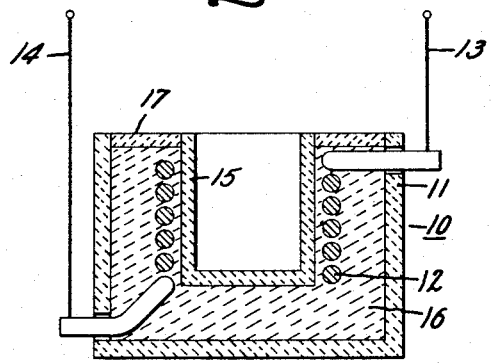

My invention may be better appreciated by reference to the following detailed description considered in conjunction with the drawings, in which:

FIGURE 1 is a schematic cross section of a metal element coated with boron nitride, FIGURE 2 is a schematic cross section of a metal element coated with a metal boride, and FIGURE 3 is a vertical section of a heating crucible.

The term "high melting point" as hereinbefore and after applied to metals is intended to designate melting temperatures in excess of 1600° C. The term "low vapor pressure" as used herein is intended to designate vapor pressure of less than $1 \times 10^{-3}$ mm. of Hg at 1500° C.

In choosing metals suitable for the fabrication of heating elements to be operated above 1000° C., it is generally necessary to use a high melting point, low vapor pressure metal. Exemplary suitable metals include titanium, zirconium, niobium, molybdenum, rhodium, tantalum, tungsten, platinum, etc. Of these metals, those having a melting point in excess of 2400° C. and a vapor pressure of below $1 \times 10^{-11}$ mm. of Hg at 1500° C. are preferred. Tantalum, niobium, tungsten, and molybdenum are exemplary of preferred metals.

In order to render high melting point, low vapor pressure metals more resistant to being fused or dissolved in ceramic or ceramic-metal melts at temperatures well below their elemental melting points, it is necessary that a protective coating be applied to these metals. According to my invention, this is accomplished by applying boron nitride to the surface of the metal to be protected. A convenient coating procedure includes forming a dispersion of boron nitride in a volatile liquid such as an alcohol, hydrocarbon, ketone, etc. Water may be used as a liquid carrier, if desired, although it is not generally preferred, since traces of water vapor are undesirable in many high temperature environments. The particular manner in which the boron nitride is applied to the metal surface is not critical, however, and any of a variety of well-known coating techniques may be utilized.

My process is particularly advantageous inasmuch as variations in the thickness of the boron nitride coating applied do not affect the final product. Upon heating the boron nitride coated metal through a temperature level of 1000° C. in an atmosphere of $2 \times 10^{-1}$ mm. Hg or less, a reaction is effected between the metal and coating to form a thin, uniform, tenaciously adherent coating. It is believed that only a thin layer of boron nitride adjacent the metal surface reacts with the substrate to form a coating comprised of a compound of metal and boron and that the remaining boron nitride is decomposed to yield boron, boron oxide, and nitrogen gas—all of which are volatile at treating temperatures.

This feature of the invention is graphically illustrated by reference to FIGURE 1, which is a cross section of a high melting point, low vapor pressure metal element 1 having a somewhat irregular coating 2 of boron nitride thereon. In FIGURE 2, the same metal element 1 is shown subsequent to heating above 1000° C. in a vacuum with a resultant coating 3 formed as the reaction product of the metal element 1 and the boron nitride. In contrast to the coating 2 of boron nitride, the metal and boron coating is thin and uniform.

The application of my invention to heating crucibles may be better understood by reference to FIGURE 3, which depicts a heating crucible 10 formed of an outer shell 11. The shell is typically formed of a refractory such as lava, for example. Within the shell is mounted an electrical resistance heating winding 12 having electrical connectors 13 and 14 attached thereto. A refractory heating cup 15 lies interiorly adjacent the winding. A particulate refractory 16 fills the zone between the heating cup and shell not occupied by electrical connectors or winding. An annular refractory ring 17 overlies the particulate refractory 16 in order to minimize the likelihood of spilling the particulate refractory in use.

In assembling the crucible, the winding 12 is coated with boron nitride and mounted in the desired position within the shell 11. The electrical connectors 13 and 14, schematically shown, are attached to the winding and are mounted in the exterior, cooler portion of the crucible. Subsequently, the particulate refractory 16 is placed in the shell to a depth sufficient to support the heating cut 15 in place. Then the remainder of the particulate refractory is placed around the winding. An annular refractory ring 17 may be optionally placed atop the particulate refractory.

In order to convert the boron nitride to a protective coating on the winding, it is not necessary that any steps be employed other than those normally employed in heating metals. That is, the step of heating through a temperature level of 1000° C. at a pressure of below $2 \times 10^{-1}$ mm. of Hg can be accomplished in the normal course of using the crucible.

My invention may be more fully appreciated by reference to the following examples.

EXAMPLE 1

A block of unfired lava (aluminum silicate) was lathe-turned to form a shell having bottom and side walls 3/16 inch in thickness. The shell was formed 2.5 inches high and 2.25 inches in diameter. The shell was perforated in a lower portion and a notch was sawed in an upper edge. The shell was cured by firing for two hours at 1100° C. Curing was visually noted by the lava changing in color from gray to light cream.

A 60 mil vacuum annealed tantalum wire 18 inches in length was scrubbed with cellulose sheets soaked in acetone until no sheet discoloration could be obtained from the wire. The wire was then stretched approximately ½ inch to remove any bends. The wire was wound on a mandrel 0.875 inch in diameter with a spacing between coils of approximately 75 mils. The coil was removed from the winding mandrel and cleaned by dipping for 7 to 10 seconds in an aqueous solution of 10 percent by weight hydrofluoric and 45 percent by weight nitric acid. During cleaning the coil was checked for excessive stressing of the wire during stretching by looking for sites of preferential etching. No such sites were found.

The winding was mounted in the shell with one end of the wire extending through the perforation and the remaining end passing through the notch. A particulate refractory of high density alumina having an average particle size of approximately 0.003–0.010 inch in average diameter was poured into the shell around the winding. The alumina was agitated during pouring to minimize voids between granules. A high density alumina crucible was inserted centrally of the winding and the particulate refractory was poured between the shell and crucible.

An alumina cement sold under the trademark "Morganite" was mixed with sufficient water to form a thick paste. The paste was spread on the surface of the particulate refractory to form an annular ring. An illuminating gas-oxygen torch was held approximately 10 inches from the ring and rotated around the ring surface so as to slowly heat the cement to 400° C.

EXAMPLE 2

The crucible forming procedure of Example 1 was repeated except that a platinum wire was used instead of tantalum.

EXAMPLE 3

The crucible forming procedure of Example 1 was repeated except that a titanium wire was used instead of tantalum.

EXAMPLE 4

The crucible forming procedure of Example 1 was repeated except that a rhodium wire was used instead of tantalum.

EXAMPLE 5

The crucible forming procedure of Example 1 was repeated except that a zirconium wire was used instead of tantalum.

EXAMPLE 6

The crucible forming procedure of Example 1 was repeated except that a niobium wire was used instead of tantalum.

EXAMPLE 7

The crucible forming procedure of Example 1 was repeated except that a tungsten wire was used instead of tantalum.

EXAMPLE 8

The crucible forming procedure of Example 1 was repeated except that a molybdenum wire was used instead of tantalum.

EXAMPLE 9

The crucibles formed by Examples 1–8 inclusive were successively employed for nickel-chromium alloy vapor deposition. In the vapor depositing arrangement, a synthetic resin tape to be coated on one face with nickel-chromium alloy was supported by a first reel serving as a mounting reel. The tape was passed from the mounting reel through guiding means to a second reel serving as a winding reel. The crucible was mounted approximately 2.5 inches below the tape midway between the first and second reels. The reels and crucible were mounted within a readily evacuable enclosure.

In use, the interior of the enclosure was evacuated to a pressure of $5 \times 10^{-5}$ mm. of Hg. Electrical current was then supplied to the nickel-chromium alloy containing crucible and the tape placed in motion. The crucibles were brought to a working temperature of approximately 1450° C. in a period of approximately five minutes. Each of the crucibles of Examples 1 to 8 inclusive failed in a period of 15 minutes or less.

EXAMPLE 10

The procedure of Example 1 was repeated except that subsequent to winding the tantalum wire but prior to placing the winding in the shell, a paste coating approximately 0.015 inch in thickness was applied to the winding formed of 0.6 gram of boron nitride and 1.80 grams of ethyl alcohol.

Subsequent to crucible formation, the crucible winding was connected to electrical leads and the crucible was placed in an evacuable enclosure. The interior of the enclosure was reduced in pressure to $1 \times 10^{-5}$ mm. of Hg. At this point, electrical energy was supplied to the electrical leads. Evacuation of the system was then resumed with the pressure being kept below $1 \times 10^{-1}$ mm. of Hg. When the pressure was again brought down to $1 \times 10^{-5}$ mm. of Hg, the formation of the coating was considered complete and the crucible ready for use.

EXAMPLE 11

The procedure of Example 10 was repeated except that a platinum wire was used instead of tantalum.

EXAMPLE 12

The procedure of Example 10 was repeated except that a titanium wire was used instead of tantalum.

EXAMPLE 13

The procedure of Example 10 was repeated except that a rhodium wire was used instead of tantalum.

EXAMPLE 14

The procedure of Example 10 was repeated except that a zirconium wire was used instead of tantalum.

EXAMPLE 15

The procedure of Example 10 was repeated except that a niobium wire was used instead of tantalum.

EXAMPLE 16

The procedure of Example 10 was repeated except that a tungsten wire was used instead of tantalum.

EXAMPLE 17

The procedure of Example 10 was repeated except that a molybdenum wire was used instead of tantalum.

EXAMPLE 18

The procedure of Example 9 was used with each of the crucibles of Examples 10–17 inclusive. In each instance, the crucibles operated without failure for a period of one hour, the time at which tape was completely transported from the mounting reel to the winding reel.

EXAMPLE 19

The crucible formed by the procedure of Example 10 was disassembled and the winding coating examined by X-ray diffraction. The interplanar spacings $d$ are compared with those of ASTM Standard tantalum boride in the following table.

TABLE

| Experimental $d$ | ASTM Standard $d$ |
|---|---|
| 3.04 | 3.08 |
| 2.53 | 2.56 |
| 2.18 | 2.20 |
| 2.15 | 2.17 |
| 1.77 | 1.79 |
| 1.64 | 1.64 |
|  | 1.58 |
|  | 1.45 |
|  | 1.41 |
|  | 1.38 |
| 1.31 | 1.31 |
| 1.27 | 1.28 |

This conclusively showed the winding coating to be tantalum boride.

While I have described my invention with respect to a preferred embodiment, it is apparent that numerous modifications will be obvious to those skilled in the art. Accordingly, it is intended that the scope of my invention be determined by reference to the following claims.

What I claim as new and desire to secure by Letters Patent of the United States is:

1. A process of coating comprising:
   applying boron nitride to the surface of a high melting point, low vapor pressure metal substrate,
   heating the resulting coated metal substrate to a temperature of at least 1000° C. at a pressure of below $2 \times 10^{-1}$ mm. Hg and reacting the boron nitride with the metal of the substrate and forming a metal boride coating on the substrate.

2. A process of coating comprising:
   applying boron nitride to the surface of a metal substrate having a melting point in excess of 1600° C. and a vapor pressure of less than $1 \times 10^{-3}$ mm. of Hg at 1500° C.
   heating the resulting coated metal substrate to a temperature of at least 1000° C. at a pressure of below $2 \times 10^{-1}$ mm. Hg and reacting the boron nitride with the metal of the substrate and forming a metal boride coating on the substrate.

3. A process of coating comprising:
   applying boron nitride to the surface of a metal substrate having a melting point in excess of 1600° C. and a vapor pressure of less than $1 \times 10^{-11}$ mm. of Hg at 1500° C.,
   heating the resulting coated metal substrate to a temperature of at least 1000° C. at a pressure of below $2 \times 10^{-1}$ mm. of Hg and reacting the boron nitride with the metal of the substrate and forming a metal boride coating on the substrate.

4. A process of coating comprising:
   applying boron nitride to the surface of a tantalum substrate,
   heating the resulting coated tantalum substrate to a temperature of at least 1000° C. at a pressure of below $2 \times 10^{-1}$ mm. Hg and reacting the boron nitride with the metal of the substrate and forming a tantalum boride coating on the substrate.

5. A process of coating comprising:
   applying boron nitride to the surface of a zirconium substrate,
   heating the resulting coated zirconium substrate to a temperature of at least 1000° C. at a pressure of below $2 \times 10^{-1}$ mm. of Hg and reacting the boron nitride with the metal of the substrate and forming a zirconium boride coating on the substrate.

6. A process of coating comprising:
   applying boron nitride to the surface of a niobium substrate,
   heating the resulting coated niobium substrate to a temperature of at least 1000° C. at a pressure of below $2 \times 10^{-1}$ mm. of Hg and reacting the boron nitride with the metal of the substrate and forming a niobium boride coating on the substrate.

7. A process of coating comprising:
   applying boron nitride to the surface of a tungsten substrate,
   heating the resulting coated tungsten substrate to a temperature of at least 1000° C. at a pressure of below $2 \times 10^{-1}$ mm. of Hg and reacting the boron nitride with the metal of the substrate and forming a tungsten boride coating on the substrate.

8. A process of coating comprising:
   applying boron nitride to the surface of a molybdenum substrate,
   heating the resulting coated molybdenum substrate to a temperature of at least 1000° C. at a pressure of below $2 \times 10^{-1}$ mm. of Hg and reacting the boron nitride with the metal of the substrate and forming a molybdenum boride coating on the substrate.

9. A process of coating comprising:
   applying boron nitride to the surface of a substrate of a metal selected from the class consisting of platinum, tantalum, titanium, rhodium, zirconium, niobium, tungsten, and molybdenum,
   heating the resulting coated metal substrate to a temperature of at least 1000° C. at a pressure of below $2 \times 10^{-1}$ mm. Hg and thereby reacting substantially all of the boron nitride with the said metal of the substrate and forming a metal boride coating on the said metal substrate.

References Cited

UNITED STATES PATENTS 3,251,719   5/1966   Tepper et al. _____ 148—6.11
3,321,337   5/1967   Patterson _____ 148—6.3

ALFRED L. LEAVITT, *Primary Examiner.*

ALAN GRIMALDI, *Assistant Examiner.*

U.S. Cl. X.R.

117—119, 128, 231; 148—6.11